Patented June 12, 1945

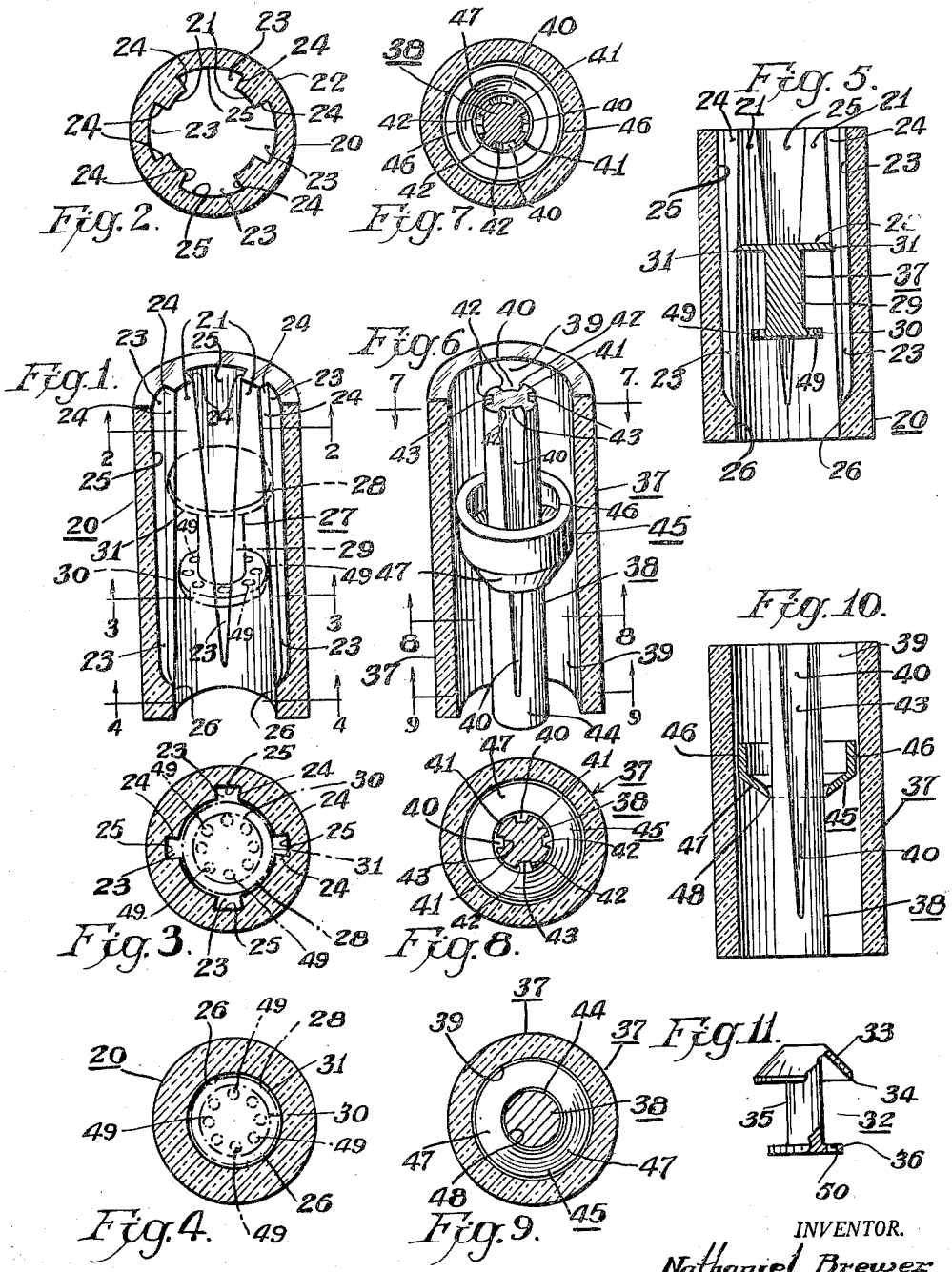

2,377,861

UNITED STATES PATENT OFFICE 2,377,861

FLOWMETER

Nathaniel Brewer, Hatfield, Pa., assignor to Fischer & Porter Company, Hatboro, Pa., a corporation of Pennsylvania Application April 27, 1943, Serial No. 484,711

9 Claims. (Cl. 73—209)

The present invention relates to flow meters and it relates more particularly to flow-meters of the type commonly referred to as rotameters in which a generally vertical elongated metering chamber having vertically varying cross-sectional area is provided with a vertically movable "float" or sinker; the position of the float within the chamber determining the size of the orifice available for vertical flow of fluid through the chamber and being a measure of the rate-of-flow.

An object of the present invention is to provide a rotameter which is simple, inexpensive and accurate. Another object of the present invention is to provide a rotameter which will accurately measure rate-of-flow and which will be generally independent of variations in viscosity of the fluid. Still another object of the present invention is to provide a rotameter in which the viscosity coefficient will be generally independent of the position of the float within the metering chamber.

Other objects and advantages of the present invention are apparent in the following detailed description, appended claims and accompanying drawing.

One disadvantage encountered in connection with the use of rotameters for determining the rate-of-flow of fluids, is that variations in viscosity of the fluid affect the position of the metering float within the conventional conically tapered tube. This "viscosity effect" is especially pronounced when liquids, particularly viscous liquids, are being metered.

It has been proposed to minimize this "viscosity effect" by modifying the shape of the rotameter float. Thus, co-pending application Serial No. 358,071 of Kermit K. Fischer, filed September 24, 1940, now Patent No. 2,323,320, issued July 6, 1943, covers the use of a metering float having a thin knife-edged flow-constricting "head" portion for reducing the "viscosity effect" or viscosity coefficient encountered during the determination of rate-of-flow of fluids. Co-pending application Serial No. 409,048 of Kermit Fischer, filed August 30, 1941, now Patent No. 2,350,343, issued June 6, 1944, covers the use of a rotameter float having a cup-like or pocket-like flow-constricting "head" portion opening toward the inlet end of the rotameter tube for further minimizing the "viscosity effect."

I have now found that "viscosity effect" can be further minimized by utilizing a by-pass of uniform radial depth and axially-varying cross-section in a metering chamber having a main fluid passageway which is axially uniform in cross-section.

That is, in the conventional rotameter employing the conically tapered metering tube and a metering float movable along the axis of the conical tube, it is apparent that the annular clearance or orifice between the flow-constricting "head" portion of the float and the inner wall of the metering tube increases in radial dimension as the float moves upward within the tube. It is, of course, essential that the cross-sectional area of the orifice increase as the float moves upward within the tube in order that the height of the float within the tube indicate the rate-of-flow of the fluid. I have found, however, that this variation in radial depth of the orifice causes a variation in the viscosity effect as the float moves vertically within the tube.

According to my present invention, therefore, I provide a rotameter in which the cross-sectional area of the by-pass increases as the float moves upward within the metering tube but in which the radial depth of the by-pass remains constant regardless of the height of the float within the tube.

For the purpose of illustrating the invention, there are shown in the accompanying drawing forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawing in which like reference characters indicate like parts throughout:

Figure 1 represents a view partly in perspective and partly in vertical cross-section of one embodiment of the present invention.

Figure 2 represents a horizontal cross-sectional view generally along the line 2—2 of Figure 1.

Figure 3 represents a horizontal cross-sectional view generally along the line 3—3 of Figure 1.

Figure 4 represents a horizontal cross-sectional view generally along the line 4—4 of Figure 1.

Figure 5 represents a vertical cross-sectional view of the embodiment of Figure 1.

Figure 6 represents a view partly in perspective and partly in vertical cross-section of another embodiment of the present invention.

Figure 7 represents a horizontal cross-sectional view generally along the line 7—7 of Figure 6.

Figure 8 represents a horizontal cross-sectional view generally along the line 8—8 of Figure 6.

Figure 9 represents a horizontal cross-sectional view generally along the line 9—9 of Figure 6.

Figure 10 represents a vertical cross-sectional view of the embodiment of Figure 6.

Figure 11 represents an elevational view of another form of metering float which may be used with the embodiment of Figures 1 to 5; parts being broken away better to reveal the construction thereof.

In the embodiment of Figures 1 to 5, I may provide a relatively thick-walled rotameter tube 20 which is usually of glass, but which may be of transparent synthetic plastic or other suitable material.

The tube 20 has a generally cylindrical inner bore 21 and a generally cylindrical outer wall 22.

A plurality (as for example 4) of flutes 23 are circumferentially disposed about the cylindrical inner bore 21 of the tube 20 and extend generally axially of said tube. Each of the flutes 23 is formed by a pair of plane radially-extending downwardly-converging side walls 24 and a back wall 25 which is formed as a segment of a concavely cylindrical surface having its center at the axis of the tube 20.

As can be seen particularly in Figures 2 and 3, each of the flutes 23 thus has a uniform radial depth throughout its axial length; the flutes being large in circumferential dimension (and, therefore, in cross-sectional area) near the top of the tube 20, as shown in Figure 2, and being smaller in circumferential dimension (and, therefore, in cross-sectional area) near the bottom of the tube 20, as shown in Figure 3.

The flutes 23 preferably terminate somewhat above the lower end of the tube 20 so that an unfluted cylindrical inner surface 26 is presented at the lowermost portion of the tube 20.

A metering float 27 is disposed within said tube 20 and is adapted for free axial movement therein.

The float 27 includes an uppermost generally radially-extending disc-like flow-constricting head portion 28, a generally axially-extending cylindrical body portion 29, having a radial dimension appreciably less than the radial dimension of the head portion 28, and a lowermost tail portion 30. The tail portion 30 is a disc-like generally radially-extending portion having a smaller radial dimension than the head portion 28. The tail portion 30 is provided with a plurality of circumferentially disposed openings 49 extending axially therethrough; the upward flow of fluid through the openings 49 of the tail portion 30 tending to give greater stability to the float 27 and to minimize wobbling or other undesirable movement thereof.

The head portion 28 of the float 27 is relatively thin, having a relatively low ratio of axial thickness to radial dimension.

The head portion 28 is preferably formed with a beveled or knife-edged periphery 31; the periphery 31 of the head portion terminating just short of the cylindrical inner bore 21 of the tube 20 so as to provide a very slight annular clearance between the periphery 31 of the flow-constricting head portion 28 of the float 27 and the cylindrical inner bore 21 of the tube 20.

The float 27 has a specific gravity somewhat greater than the specific gravity of the fluid so that the float ordinarily remains at the bottom of the tube 20 (with the flow-constricting periphery 31 of the head 28 adjacent the unfluted lowermost portion 26 of the tube 20) when there is not upward flow of fluid within the tube 20.

Since there is very little annular clearance between the flow-constricting periphery 31 of the float and the unfluted lowermost portion 26 of the tube 20, an upward flow of fluid will move the float 27 upwardly within the tube until the flow-constricting periphery 31 comes opposite the lower ends of the flutes 23.

The flutes 23 serve as by-passes for the fluid and permit the fluid to flow therethrough past the flow-constricting periphery 31 of the float 27. At a constant rate-of-flow, the float 27 will remain stationary at some point within the tube 20; the pressure-drop of the fluid across the float being constant and being equal to the negative buoyancy of the float within the fluid. When the rate-of-flow increases, the upward pressure upon the float increases and the float is raised within the tube. When this occurs, the flow-constricting periphery 31 of the float 27 comes opposite the larger upper portion of the flutes 23 thus increasing the by-pass area available for flow of fluid past the flow-constricting periphery 31 of the float.

It can thus readily be seen that the position of the float 27 within the vertical tube 20 is a direct indication of the rate-of-flow of the fluid; the greater the rate-of-flow the higher the position of the float within the tube. That is, the greater the rate-of-flow, the higher the float will stand within the tube and the greater will be the cross-sectional area provided by the tapered flutes for flow of fluid past the float; the pressure-drop across the float being constant whether the float is near the bottom of the tube or near the top of the tube.

As discussed hereinabove, while the by-pass area across the float increases as the float moves upward within the tube upon increase of the rate-of-flow, the radial depth of the by-pass remains constant at all times whether the flow-constricting periphery of the float is near the bottom of the tapered flutes 23 or the top of the flutes 23.

I have discovered that the use of by-passes of axially-varying cross-sectional area and constant radial depth gives rate-of-flow readings which are relatively insensitive to and generally unaffected by variations in viscosity of the fluid.

In place of the float 27 described hereinabove, I may employ the float 32 shown in Figure 11.

The float 32 has an uppermost generally conical downwardly-opening umbrella-like flow-constricting head portion 33 having a beveled or knife-edged outermost periphery 34. A generally cylindrical body portion 35 extends downwardly from the head portion 33. A generally radially-extending disc-like tail portion 36 is formed at the lower end of the body portion 35. The tail portion 36 is provided with a plurality of circumferentially disposed axially-extending openings 50 therethrough; the tail portion 36 resembling the tail portion 30 described hereinabove in connection with the float 27 of Figure 1.

The float 32 is adapted to operate within the tube 20 in the manner described hereinabove in connection with the float 27; the flow-constricting periphery 34 of the float 32 providing a very slight annular clearance within the cylindrical inner bore 21 of said tube 20.

Floats of the character of the float 27 and particularly of the character of the float 32 have been found to effect great reduction in "viscosity effect" and to provide rate-of-flow measurements and which are only very slightly affected by viscosity variations even with the conventional conically tapered metering tube.

As explained in the co-pending applications Serial Nos. 358,071 and 409,048 of Kermit Fischer, a float having a head portion of the shape of that of the float 27 and particularly of the shape of that of the float 32 will cause uniformity of turbulence and uniformity of flow coefficient and, therefore, immunity from viscosity over small sections of the conventional tapered metering tube. However, it has been extremely difficult, if not impossible to obtain immunity to large viscosity changes throughout the length of the conventional tapered metering tube. Since, as the float moves vertically within the conventional tapered metering tube, neither the fluid velocity across the float, nor the pressure-drop across the float changes, the failure of the metering float to give viscosity-free readings throughout the length of the conventional tapered tube is, according to my theory, due to the variation in the radial depth or thickness of the by-pass. That is, according to my theory, a float shape which will cause uniformity of turbulence (and, therefore, uniformity of flow coefficient and immunity from viscosity) with one particular thickness or radial depth of by-pass will not necessarily bring about the same results with a by-pass having a greater or smaller thickness or radial depth.

I have found that my theory is borne out by the fact that the use of the novel by-passes described hereinabove (in which the cross-sectional area available for fluid flow is varied without varying the thickness or radial depth of the by-pass) gives immunity from viscosity throughout the by-pass length of the metering tube.

In Figures 6 to 10, I have shown another embodiment of the present invention which also provides complete viscosity immunity throughout the length of the metering chamber.

In the embodiment of Figures 6 to 10, I may provide a cylindrical tube 37 of glass or transparent synthetic plastic or other suitable material.

A rod 38 is disposed generally along the axis of said tube 37. The rod 38 is generally cylindrical and is recessed substantially from the inner bore 39 of the tube 37.

A plurality (as for example 4) of flutes 40 are circumferentially disposed about the cylindrical outer surface 41 of the rod 38 and extend generally axially of said rod. Each of the flutes 40 is formed by a pair of plane radially-extending downwardly-converging side walls 42 and a back wall 43 which is formed as a segment of a convexly cylindrical surface having its center at the axis of the rod 38 (which is also the axis of the tube 37).

It can be seen that the flutes 40 varying in circumferential dimension and, therefore, in cross-sectional area while being constant in depth or radial dimension throughout their axial length, in the same way as described hereinabove in connection with the flutes 23 of the embodiment of Figures 1 to 5.

The flutes 40 terminate somewhat above the lower end of the rod 38 so that an unfluted cylindrical portion 44 is provided at the lowermost end of said rod 38.

A float 45 is disposed within said tube 37 and about said rod 38 and is adapted for free axial movement. The float 45 includes an uppermost annular body portion 46 disposed in close proximity to the inner bore 39 of the tube 37. An annular conically tapered head portion 47 extends downwardly from said annular body portion 46 and terminates in an annular beveled or knife-edged flow-constricting periphery 48 which provides a very slight annular clearance with the cylindrical outer surface 41 of the rod 38.

The float 45 has a specific gravity somewhat greater than the specific gravity of the fluid so that, when there is no upward flow of fluid through the tube 37, the float 45 remains at the bottom of said tube with the flow-constricting periphery 48 adjacent the lowermost unfluted portion 44 of the rod 38.

When fluid begins to flow upwardly through the tube 37, the float 45 is lifted until the flow-constricting periphery 48 thereof comes opposite the lowermost portions of the flutes 40 to provide fluid by-passes across the float.

An increase in the rate-of-flow of fluids will cause a corresponding elevation of the float 45 within the tube 37 in the same manner as described hereinabove in connection with the embodiment of Figures 1 to 5.

It can be seen that the by-passes provided by the flutes 40 will be larger in cross-sectional area when the float 45 is near the upper end of the flutes while the radial depth or thickness of the by-passes remains constant.

Thus, the embodiment of Figures 6 to 10 provides complete viscosity immunity throughout the fluted axial dimension of the metering chamber in the same manner as discussed hereinabove in connection with the embodiment of Figures 1 to 5 and 11.

While I prefer to terminate the flutes 23 (or the flutes 40) somewhat above the lowermost end of the metering chamber in order to make the float responsive to low rates-of-flow, it is apparent that the flutes can be extended so that they terminate at the bottom of the metering chamber.

While the rotameter construction of the present invention is intended to be used primarily with floats of the general character described hereinabove (which floats tend to minimize the effect of viscosity variations upon the rate-of-flow reading) the novel uniform-depth by-pass construction of the present invention may also be employed with other types of rotameter floats, which are affected to a greater extent by variations in fluid viscosity. That is, even where a rotameter float is appreciably affected by variations in fluid viscosity, the use of the novel uniform-depth by-pass construction of the present invention will tend to make the viscosity effect more or less independent of the position of the float within the metering chamber so that the use of a viscosity correction factor is simplified.

The metering chambers described hereinabove can be used with any conventional type of rotameter frame for connection into a pipe-line or the like, or they can be connected at their ends in fluid-tight relationship to separate "heads" or "fittings" of conventional construction. The ends of the tube 20 or the tube 37 can be made fluid-tight with respect to the "heads" or "fittings" by conventional stuffing-boxes (not shown) having compressible packing rings and adjustable stuffing-glands; the glands tending to compress the packing rings against the outer wall of the metering tube in conventional and well-known manner.

The rotameter construction of the present invention may also be employed with a rotameter of the type shown in my co-pending application Serial No. 484,710, filed April 27, 1943, wherein a fluid-tight seal is effected by an apertured, axially-compressible sealing gasket placed intermediate each of the relatively thick end-walls of the tube 20 (or the tube 37) and corresponding seating surfaces in inter-connected "heads"; the "heads" exerting inward axial pressure upon the sealing gaskets to provide the fluid-tight seal. The metering chamber of the present invention may also be employed with the rotameter shown in United States Patent 2,311,181 to Kenneth D. Bowen, filed September 6, 1940, and issued February 16, 1943.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described my invention, what I claim as new and desire to protect by Letters Patent is:

1. A rotameter for measuring the rate-of-flow of fluid comprising an elongated metering chamber having a generally vertically-extending fluid passageway of uniform cross-sectional configuration, and a float adapted for free up-and-down movement within said fluid passageway, said float having a generally transversely-extending portion adapted to constrict the flow of fluid through said passageway, said metering chamber having a generally vertically-extending fluid by-pass groove formed therein whereby fluid can by-pass the periphery of the flow-constricting portion of said float while flowing vertically through said chamber, said by-pass groove having a generally uniform depth and having a vertically-varying cross-sectional area.

2. A rotameter for measuring the rate-of-flow of fluid comprising an elongated metering chamber having a generally vertically-extending fluid passageway of uniform cross-sectional configuration, and a float adapted for free up-and-down movement within said fluid passageway, said float having a generally transversely-extending portion adapted to constrict the flow of fluid through said passageway, the periphery of said transversely-extending portion conforming generally to and having a slight clearance within the walls of said passageway, said metering chamber having a generally vertically-extending fluid by-pass flute formed in a wall of said fluid passageway whereby fluid can by-pass the periphery of the flow-constricting portion of said float, said by-pass flute having a generally uniform depth and having a vertically-varying cross-sectional area.

3. A rotameter for measuring the rate-of-flow of fluid comprising an elongated generally vertically-extending fluid pasageway of uniform cross-sectional configuration, a flute formed in a wall of said fluid passageway and extending generally vertically therealong, said flute having a generally uniform depth and having a vertically-varying cross-sectional area, and a float adapted for free up-and-down movement within said fluid passageway, said float having a generally transversely-extending portion adapted to constrict the flow of fluid through said passageway, said flute providing a uniform depth by-pass to permit flow of fluid vertically across the periphery of the flow-constricting portion of said float.

4. A rotameter for measuring the rate-of-flow of fluid comprising an elongated generally vertically-extending metering tube having a cylindrical inner bore, a flute formed in the inner bore of said tube and extending generally axially therealong, said flute having a generally uniform depth and having a vertically-varying cross-sectional area, and a float adapted for free up-and-down movement within the cylindrical inner bore of said metering tube, said float having a generally transversely-extending portion adapted to constrict the flow of fluid through said inner bore, said flute providing a fluid by-pass of uniform depth across the periphery of the flow-constricting portion of said float.

5. A rotameter for measuring the rate-of-flow of fluid comprising an elongated generally vertically-extending metering tube having a cylindrical inner bore, a plurality of circumferentially disposed generally axially-extending flutes formed in said inner bore, said flutes having uniform radial depth and having axially-varying cross-sectional area, and a float adapted for free up-and-down movement within said inner bore, said float having a generally transversely-extending flow-constricting portion, the periphery of said flow-constricting portion conforming generally to and having a slight annular clearance within the cylindrical inner bore of said tube, said flutes providing uniform depth fluid by-passes across the periphery of the flow-constricting portion of said float.

6. A rotameter for measuring the rate-of-flow of fluid comprising an elongated generally vertically-extending metering conduit having an axially uniform internal cross-section, a rod extending inside of said conduit and generally co-axial therewith, said rod being substantially spaced from the inner wall of said conduit and being generally complementary thereto, thereby to provide an axially-uniform annular fluid passageway intermediate said conduit and said rod, said rod having an axially-extending flute formed in its outer surface, said flute having a generally uniform depth and having an axially-varying cross-sectional area, and a float adapted for free up-and-down movement within the annular fluid passageway intermediate said conduit and said rod, said float having a generally transversely-extending portion adapted to constrict the flow of fluid through said annular passageway, said flow-constricting portion terminating adjacent the outer surface of said rod, said flute providing a uniform depth fluid by-pass across the periphery of the flow-constricting portion of said float.

7. A rotameter for measuring the rate-of-flow of fluid comprising an elongated generally vertically-extending metering conduit having an axially uniform internal cross-section, a rod extending inside of said conduit and generally co-axial therewith, said rod being substantially spaced from the inner wall of said conduit and being generally complementary thereto, thereby to provide an axially-uniform annular fluid passageway intermediate said conduit and said rod, said rod having a plurality of circumferentially spaced axially-extending flutes formed in its outer surface, said flutes having generally uniform depth and having axially-varying cross-sectional area, and a float adapted for free up-and-down movement within the annular fluid passageway intermediate said conduit and said rod, said float having a generally transversely-extending portion adapted to constrict the flow of fluid through said annular passageway, said flow-constricting portion terminating adjacent the outer surface of said rod, said flutes providing uniform depth fluid by-passes across the periphery of the flow-constricting portion of said float.

8. A rotameter for measuring the rate-of-flow of fluid comprising an elongated generally vertically-extending metering tube having a cylindrical inner bore, a rod extending generally co-axially within said tube and spaced substantially therefrom to provide an annular fluid passageway therein, said rod having a generally cylindrical outer surface and having an axially-extending flute formed in its outer surface, said flute having a generally uniform radial depth and having an axially-varying cross-sectional area, and a float adapted for free up-and-down movement within said annular passageway, said float having an annular flow-constricting portion terminating adjacent the cylindrical outer surface of said rod, said flute providing a uniform depth by-pass across the periphery of the flow-constricting portion of said float.

9. A rotameter for measuring the rate-of-flow of fluid comprising an elongated generally vertically-extending metering tube, a generally cylindrical rod extending co-axially within said tube and spaced substantially therefrom to provide an annular fluid passageway therein, said rod having a plurality of circumferentially disposed axially-extending flutes formed in its outer surface, said flutes having uniform radial depth and having axially-varying cross-sectional area, and a float adapted for free up-and-down movement within said annular fluid passageway, said float having an annular flow-constricting portion terminating adjacent the cylindrical outer surface of said rod, said flutes providing uniform depth fluid by-passes across the periphery of the flow-constricting portion of said float.

NATHANIEL BREWER.